(12) United States Patent
Nakamura et al.

(10) Patent No.: US 11,035,418 B2
(45) Date of Patent: Jun. 15, 2021

(54) TOLERANCE RING

(71) Applicants: TOGO SEISAKUSYO CORPORATION, Aichi (JP); TOYOTA JIDOSHA KABUSHIKI KAISHA, Toyota (JP)

(72) Inventors: Yuji Nakamura, Aichi (JP); Hirofumi Kurachi, Achi (JP); Akitaka Ichikawa, Toyota (JP)

(73) Assignees: TOGO SEISAKUSYO CORPORATION, Aichi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 684 days.

(21) Appl. No.: 15/747,070

(22) PCT Filed: Jul. 26, 2016

(86) PCT No.: PCT/JP2016/071846
§ 371 (c)(1),
(2) Date: Jan. 23, 2018

(87) PCT Pub. No.: WO2017/026273
PCT Pub. Date: Feb. 16, 2017

(65) Prior Publication Data
US 2018/0372163 A1 Dec. 27, 2018

(30) Foreign Application Priority Data

Aug. 7, 2015 (JP) .............................. JP2015-157754

(51) Int. Cl.
*F16D 7/02* (2006.01)
*F16D 1/08* (2006.01)
(Continued)

(52) U.S. Cl.
CPC ............ *F16D 7/021* (2013.01); *F16C 35/073* (2013.01); *F16D 1/0835* (2013.01); *F16F 15/0237* (2013.01); *Y10T 403/7061* (2015.01)

(58) Field of Classification Search
CPC .. F16D 1/0835; F16D 7/021; Y10T 403/7061; F16F 15/0237; F16C 35/072;
(Continued)

(56) References Cited

U.S. PATENT DOCUMENTS 2,897,026 A 7/1959 Haller et al.
3,838,928 A * 10/1974 Blaurock .............. F16D 1/0835
403/372

(Continued)

FOREIGN PATENT DOCUMENTS

EP 1568554 A1 * 8/2005 ....... B60R 25/02107
EP 2 532 907 12/2012
(Continued)

OTHER PUBLICATIONS

International Search Report dated Sep. 27, 2016 from International Application No. PCT/JP2016/071846.
(Continued)

*Primary Examiner* — Matthew R McMahon
(74) *Attorney, Agent, or Firm* — Beyer Law Group LLP

(57) ABSTRACT

A tolerance ring includes a cylindrical main body, which has an inner circumferential surface and an outer circumferential surface, and a plurality of protuberances, which protrudes outward in a radial direction from the inner circumferential surface of the main body. The main body includes a recess that extends from an end of the main body to at least one of the protuberances and communicates with an inside of the at least one of the protuberances.

5 Claims, 8 Drawing Sheets

(51) Int. Cl.
*F16C 35/073* (2006.01)
*F16F 15/023* (2006.01)

(58) Field of Classification Search
CPC .......... F16C 27/02; F16C 27/04; F16C 17/02; F16C 17/024
See application file for complete search history.

(56) References Cited

U.S. PATENT DOCUMENTS

| | | | |
|---|---|---|---|
| 3,976,340 A * | 8/1976 | Pitner | F16C 19/466 384/581 |
| 4,790,683 A | 12/1988 | Cramer et al. | |
| 8,337,090 B2 * | 12/2012 | Herborth | F16C 27/04 384/535 |
| 8,777,760 B2 * | 7/2014 | Varnoux | F16D 7/021 464/41 |
| 9,019,663 B2 * | 4/2015 | Araki | G11B 5/5569 360/265.6 |
| 9,109,632 B2 * | 8/2015 | Asakura | F16D 7/021 |
| 9,255,609 B2 * | 2/2016 | Araki | F16D 7/024 |
| 2006/0083448 A1 * | 4/2006 | Alam | F16C 27/045 384/99 |
| 2013/0028732 A1 * | 1/2013 | Golovatai-Schmidt | F16C 27/045 415/229 |
| 2013/0324345 A1 | 12/2013 | Asakura et al. | |
| 2015/0308511 A1 | 10/2015 | Asakura et al. | |

FOREIGN PATENT DOCUMENTS

| | | |
|---|---|---|
| JP | 06-065625 | 9/1994 |
| JP | 2002-181068 | 6/2002 |
| JP | 2012-197927 | 10/2012 |
| JP | 2015-137732 | 7/2015 |
| WO | WO 2012/119312 | 9/2012 |
| WO | WO 2013/172313 | 11/2013 |

OTHER PUBLICATIONS

International Preliminary Report on Patentability dated Feb. 13, 2018 from International Application No. PCT/JP2016/071846.
Japanese Office Action dated Jun. 4, 2019 from Japanese Application No. 2015-157754.

* cited by examiner

TOLERANCE RING

TECHNICAL FIELD

The present invention relates to a tolerance ring.

BACKGROUND ART

Some tolerance rings are fitted in an elastically deformed state between the outer circumferential surface of a shaft and the inner circumferential surface of a sleeve into which the shaft is inserted so as to constitute part of a torque limiter. In such a torque limiter using a tolerance ring, when the torque transmitted between the shaft and the sleeve exceeds an allowable value, which is determined by the maximum frictional force between the tolerance ring and the shaft or the sleeve, the tolerance ring rotates while slipping on the shaft or sleeve, so that the transmitted torque is limited to be less than or equal to the allowable value.

Patent Document 1 discloses one example of such a tolerance ring. The cylindrical main body of this tolerance ring has protuberances, which protrude radially outward. Lubricant for limiting wear caused by slip rotation of the tolerance ring can be stored between the protuberances and the shaft, which is arranged radially inward of the main body.

PRIOR ART DOCUMENT

Patent Document

Patent Document 1: Japanese Laid-Open Patent Publication No. 2012-197927

SUMMARY OF THE INVENTION

Problems that the Invention is to Solve

Wear debris produced by repeated slip rotations of the tolerance ring accumulates between the protuberances of the tolerance ring and the shaft, that is, inside the protuberances. When slip rotation of the tolerance ring occurs with some of the wear debris accumulated inside the protuberances caught between the tolerance ring and the shaft or the sleeve, the wear debris further wears the tolerance ring and the shaft or the sleeve, producing more wear debris. This promotes the wear and thus the generation of wear debris.

This problem also exists in a limiter in which, when the holding force between the shaft and the sleeve exceeds the above-mentioned allowable value, slip in the axial direction occurs between the tolerance ring and the shaft or the sleeve, so that the holding force is limited to be less than or equal to the allowable value.

It is an objective of the present invention to provide a tolerance ring capable of limiting wear in a favorable manner.

Means for Solving the Problems

To achieve the foregoing objective, a tolerance ring is provided that includes a cylindrical main body, which has an inner circumferential surface and an outer circumferential surface, and a plurality of protuberances, which protrudes outward in a radial direction from the inner circumferential surface of the main body. The main body includes a recess that extends from an end of the main body to at least one of the protuberances and communicates with an inside of the at least one of the protuberances.

Another tolerance ring is provided that includes a cylindrical main body, which has an inner circumferential surface and an outer circumferential surface, and a plurality of protuberances, which protrudes inward in a radial direction from the outer circumferential surface of the main body. The main body includes a recess that extends from an end of the main body to at least one of the protuberances and communicates with an inside of the at least one of the protuberances.

A yet another tolerance ring is provided that includes a cylindrical main body, which has an inner circumferential surface and an outer circumferential surface, and a plurality of protuberances, which protrudes outward in a radial direction from the inner circumferential surface of the main body or protrudes inward in the radial direction from the outer circumferential surface of the main body. The main body includes a notch that extends from an end of the main body to at least one of the protuberances.

MODES FOR CARRYING OUT THE INVENTION

First Embodiment

A tolerance ring 10 according to a first embodiment will now be described.

Figure 1:
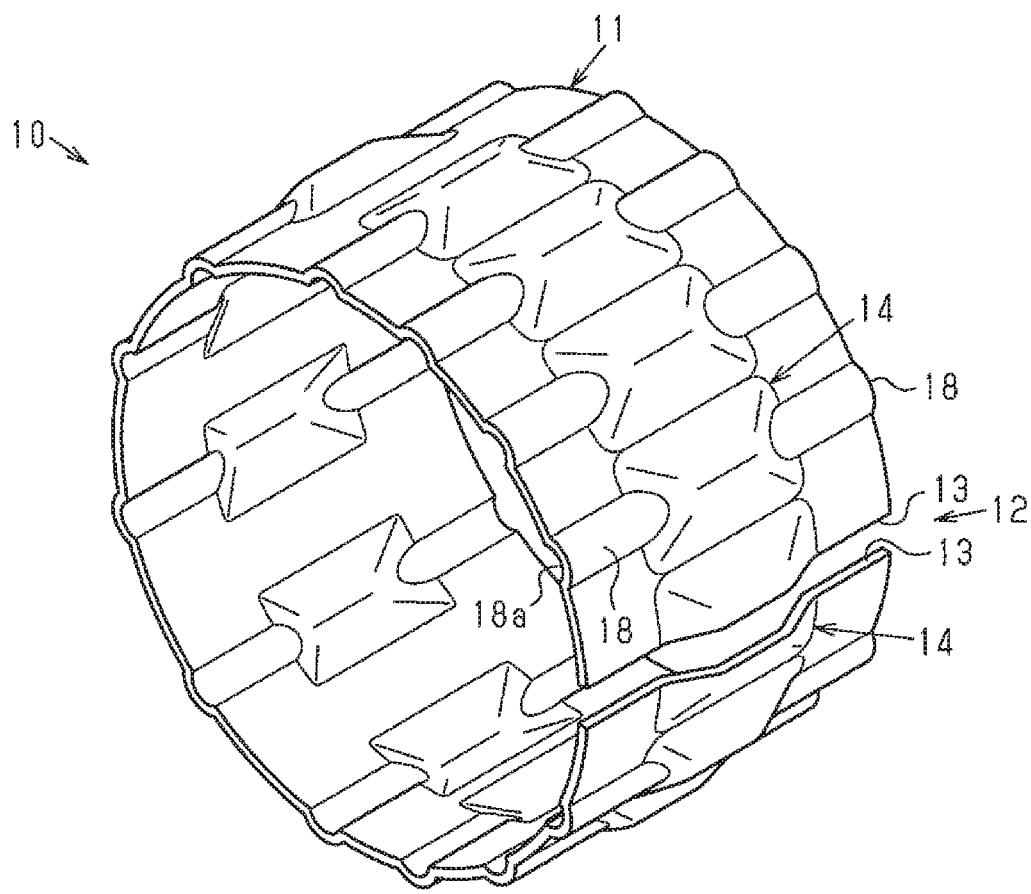
FIG. 1 is a perspective view illustrating a tolerance ring according to a first embodiment.

As shown in FIG. 1, the tolerance ring 10 has a cylindrical main body 11. The main body 11 is formed by bending a rectangular metal plate having long sides and short sides into a cylindrical shape. The main body 11 has two ends 13, which face each other in the circumferential direction of the main body 11. An end gap 12 is provided between the ends 13. The end gap 12 extends in the axial direction of the main body 11.

In the following description, "axial direction" refers to the axial direction of the main body 11, "radial direction" refers to a direction orthogonal to the axial direction, and "circumferential direction" refers to a rotational direction around the axial direction.

Figure 2:
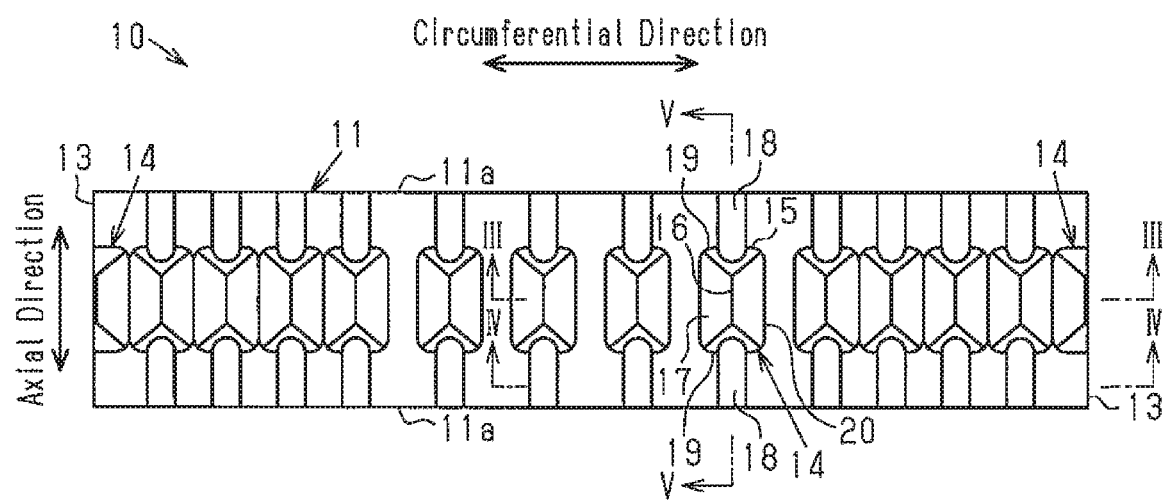
FIG. 2 is a front view showing a developed state of the tolerance ring of FIG. 1.

As shown in FIGS. 1 and 2, the main body 11 has protuberances 14, which protrude radially outward from the radial direction from the inner circumferential surface of the main body 11. Each protuberance 14 has a rectangular shape having an outer shape with long sides and short sides when viewed in the radial direction. The longitudinal direction of the protuberance 14 matches with the axial direction of the main body 11. The protuberances 14 are arranged in a single row in the circumferential direction of the main body 11.

Also, the spaces between the protuberances 14 are shorter in the vicinity of the end gap 12 than in the other sections. That is, the sixth to ninth protuberances 14 counted from one of the ends 13, which form the end gap 12, are arranged in the circumferential direction with spaces in between. In contrast, the first to fifth protuberances 14 counted from each of the ends 13, which form the end gap 12, are provided continuously in the circumferential direction without spaces in between. That is, the protuberances 14 provided in the vicinity of the end gap 12 are first protuberances, which are arranged continuously in the circumferential direction without spaces in between. The protuberances 14 provided in the region farther apart from the end gap 12 in the circumferential direction than the first protuberances are second protuberances, which are arranged in the circumferential direction with spaces in between. This structure increases the stiffness of the main body 11 in the vicinity of the end gap 12.

The protuberances 14 will now be described.

Figure 4A:
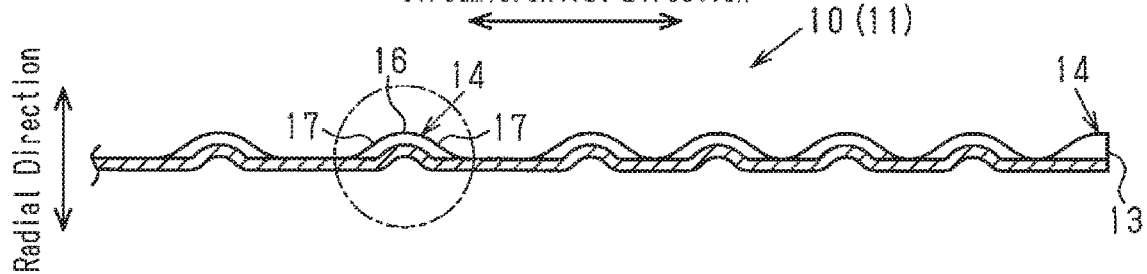
FIG. 4A is a cross-sectional view taken along line IV-IV in FIG. 2.
Figure 4B:
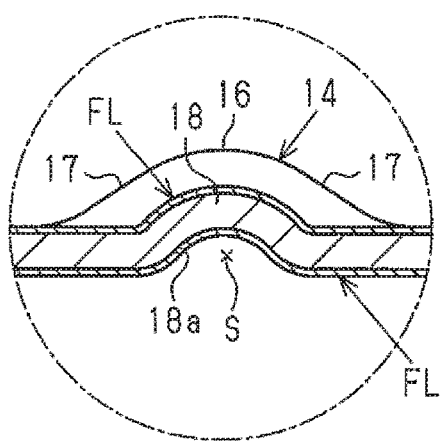
FIG. 4B is a partially enlarged view of FIG. 4A.
Figure 5A:
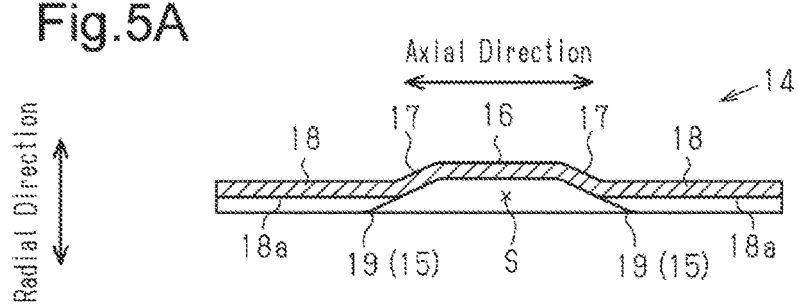
FIG. 5A is a cross-sectional view taken along line V-V in FIG. 2.
Figure 5B:
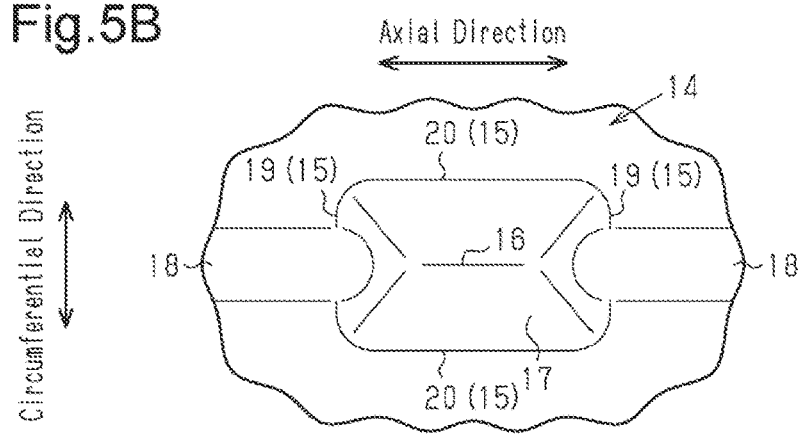
FIG. 5B is a front view of a protuberance as viewed in the radial direction.

As shown in FIGS. 3A to 5B, each protuberance 14 has starting sites (proximal sites) 15 as the starting points of the protruding shape of the protuberances 14. As shown in FIG. 5B, the starting sites 15 constitute the outer edges of protuberance 14 when viewed in the radial direction. The protuberance 14 has two short-side ends 19, which are on the opposite sides in the axial direction of the main body 11, and two long-side ends 20, which are on the opposite sides in the circumferential direction of the main body 11. The short-side ends 19 extend in the circumferential direction of the main body 11, and the long-side ends 20 extend in the axial direction of the main body 11.

In addition, each protuberance 14 has a ridge portion 16 constituted by the highest site, or the outermost site in the radial direction of the main body 11, and the sites in the vicinity of the outermost site. Among the protuberances 14, each of the two protuberances 14 closest to the end gap 12 (hereinafter, particularly referred to as "end-gap protuberances" when necessary), has a ridge portion 16 that is formed by one of the ends 13, which form the end gap 12. The end-gap protuberances are smaller in size than the other protuberances 14 and approximately equal to the size and shape of one of the two divided pieces obtained by dividing one of the other protuberances 14 along the ridge portion 16.

Each protuberance 14 also has rising portions 17 between the starting sites 15 and ridge portion 16. The rising portions 17 extend from the starting sites 15 toward the ridge portion 16 so as to gently slope outward in the radial direction. A depression S is defined radially inside of each protuberance 14 by the inner walls of the starting sites 15, the ridge portion 16, and the rising portions 17.

As shown in FIGS. 1 and 2, the protuberances 14 excluding the end-gap protuberances are each provided with extensions 18, which constitute part of the protuberance 14 and extend straight to opposite ends 11a in the axial direction of the main body 11. Hereinafter, when distinguishing the protuberances 14 with the extensions 18 from the end-gap protuberances, the former will be referred to as specific protuberances. The extensions 18 extend from the opposite ends in the axial direction of each specific protuberance of the main body 11.

Figure 3A:
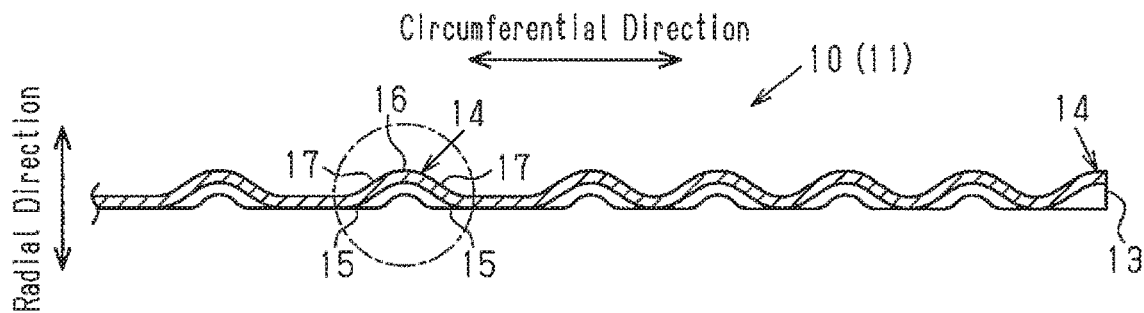
FIG. 3A is a cross-sectional view taken along line in FIG. 2.
Figure 3B:
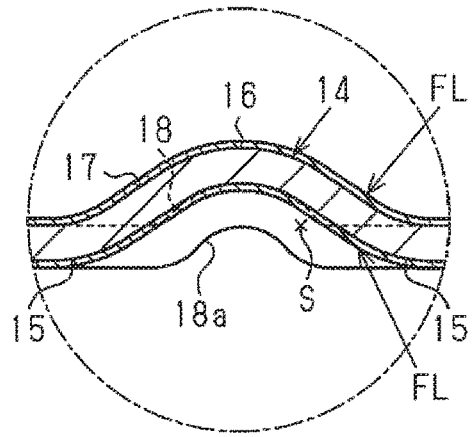
FIG. 3B is a partially enlarged view of FIG. 3A.

As shown in the enlarged views of FIGS. 3B and 4B, a recess 18a is formed on the inner surface in the radial direction of each extension 18, that is, on the inner circumferential surface of the main body 11. Regardless of the thickness of the main body 11, the recesses 18a may have a depth equal to the thickness or may have a depth greater or less than the thickness. The recesses 18a extend straight respectively from the ends 11a on the opposite sides in the axial direction of the main body 11 and communicate with the inside of the protuberance 14, that is, the depression S.

As shown in FIGS. 5A and 5B, of the short-side ends 19 and the long-side ends 20 of each specific protuberance, the extensions 18 extend from the short-side ends 19, which are on the opposite sides in the axial direction of the main body 11. Each extension 18 extends from a position midway on the slope of the rising portion 17 in the main body 11. That is, the depression S and the recess 18a in the radial direction of the extension 18 communicate with each other.

As shown in the enlarged views of FIGS. 3B and 4B, the inner side and outer side in the radial direction of the main body 11, that is, the inner circumferential surface and the outer circumferential surface of the main body 11 are each subjected to manganese phosphate coating treatment, which is an antiwear coating treatment.

The steps of the manganese phosphate coating treatment will now be described. First, a degreasing step is performed to remove oil on the inner circumferential surface and the outer circumferential surface of the main body 11 before the coating treatment. Then, a surface conditioning step is performed in which fine irregularities are formed on the inner circumferential surface and the outer circumferential surface of the main body 11, which has undergone the degreasing step. Thereafter, a film forming step is performed to form a manganese phosphate coating layer having a predetermined thickness on the inner circumferential surface and the outer circumferential surface of the main body 11, which has undergone the surface conditioning step. Subsequently, a baking step, or thermal treatment, is performed to dry the main body 11, which has undergone the film forming step, so that the manganese phosphate coating layer is fixed. The baking step is optional. Next, an antirust coating step is performed, in which antirust oil is applied to the inner circumferential surface and the outer circumferential surface of the main body 11, which has undergone the film forming step or the baking treatment step. A manganese phosphate coating FL made of crystals of porous manganese phosphate is formed on the inner circumferential surface and the outer circumferential surface of the main body 11, which has undergone the above steps.

The operation of the tolerance ring 10 of the present embodiment will now be described.

Figure 6:
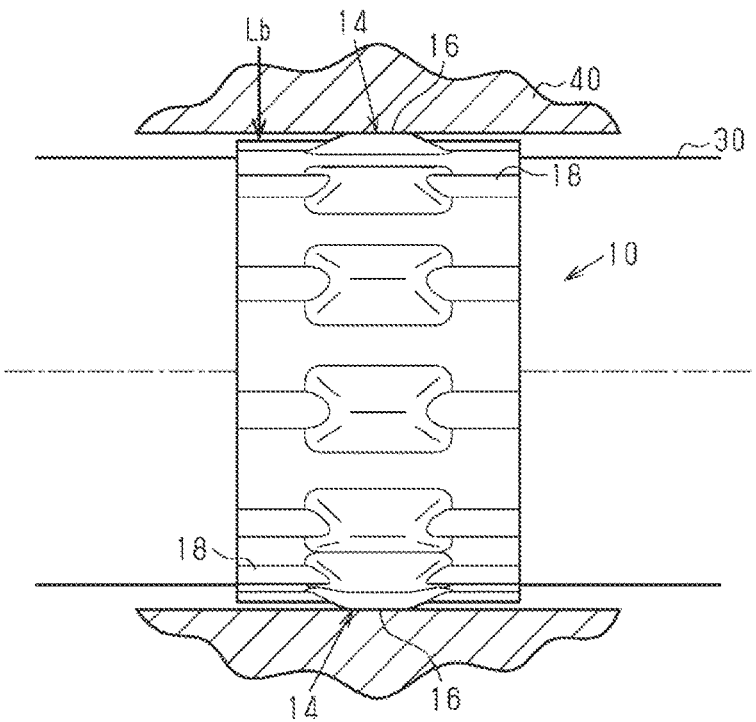
FIG. 6 is a cross-sectional view showing a torque limiter in which the tolerance ring is used.

As shown in FIG. 6, the tolerance ring 10 is fitted in an elastically deformed state between the outer circumferential surface of the shaft 30 and the inner circumferential surface of the sleeve 40, into which the shaft 30 is inserted. Accordingly, the tolerance ring 10 constitutes part of the torque limiter. In this case, the ridge portions 16 of the protuberances 14 contact the inner circumferential surface of the sleeve 40. In contrast, the extensions 18 of the specific protuberances of the protuberances 14 are not in contact with the inner circumferential surface of the sleeve 40.

Figure 7:
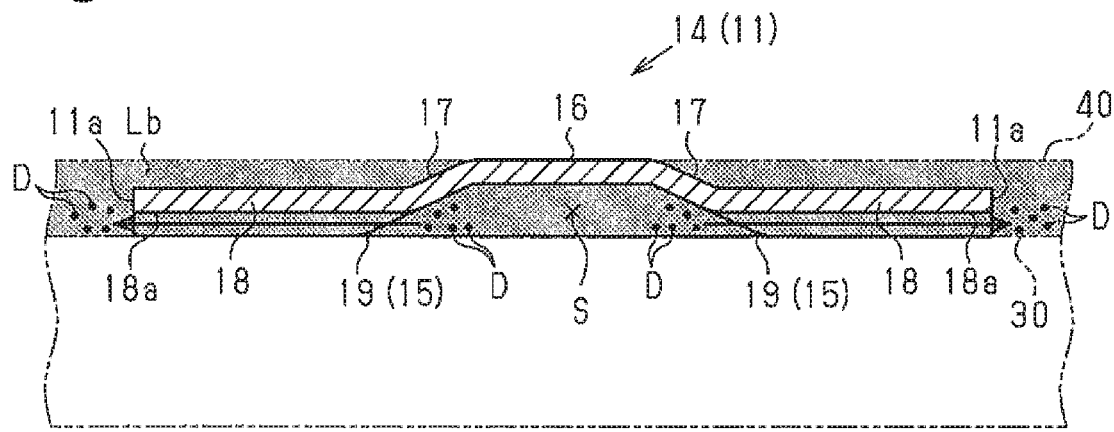
FIG. 7 is a cross-sectional view showing a specific protuberance of the tolerance ring.

As shown in FIG. 7, lubricant Lb is stored between the outer circumferential surface of the shaft 30, to which the tolerance ring 10 is fitted, and the inner circumferential surface of the sleeve 40. The lubricant Lb can flow into and out of the specific protuberances through the recesses 18a of the extensions 18 via the ends 11a on the opposite sides in the axial direction of the main body 11 of the tolerance ring 10.

When repetitive slip rotations of the tolerance ring 10 occur between the tolerance ring 10 and the shaft 30, the slip rotations of the tolerance ring 10 produce wear debris D, which tends to accumulate between the tolerance ring 10 and the outer circumferential surface of the shaft 30, especially inside the specific protuberances (the depressions S).

However, in the process of the lubricant Lb flowing into or out of the specific protuberances through the recesses 18a, the wear debris D is discharged from the inside of the specific protuberances, for example, to the outside of the specific protuberances.

As the lubricant flowing into the specific protuberances is discharged in this manner, the wear debris D, which is generated by repeated slip rotations of the tolerance ring 10, is discharged from the inside of the specific protuberances. Thus, the wear debris D does not easily accumulate in the specific protuberances. As a result, during slip rotation of the tolerance ring 10, the wear debris D between the shaft 30 and the tolerance ring 10 and between the sleeve 40 and the tolerance ring 10 is reduced.

The present embodiment achieves the following advantages.

(1) By introducing and discharging the lubricant Lb into and out of the specific protuberances through the recesses 18a provided in the specific protuberances, the wear debris D produced by repeated slip rotations of the tolerance ring 10 is easily discharged from the inside of the specific protuberances, so that the wear debris D will not easily accumulate therein. As a result, further generation of wear debris D will be limited, so that wear of the tolerance ring is suppressed in a favorable manner.

(2) The manganese phosphate coating FL is provided on the inner circumferential surface and the outer circumferential surface of the main body 11. This further suppresses the wear of the tolerance ring 10 and thus prevents the allowable torque value from being reduced during the use of the tolerance ring 10.

Second Embodiment

A tolerance ring according to a second embodiment will now be described. The same reference numerals are given to those components that are the same as the corresponding components of the already described embodiment, and redundant explanations are omitted.

Figure 8A:
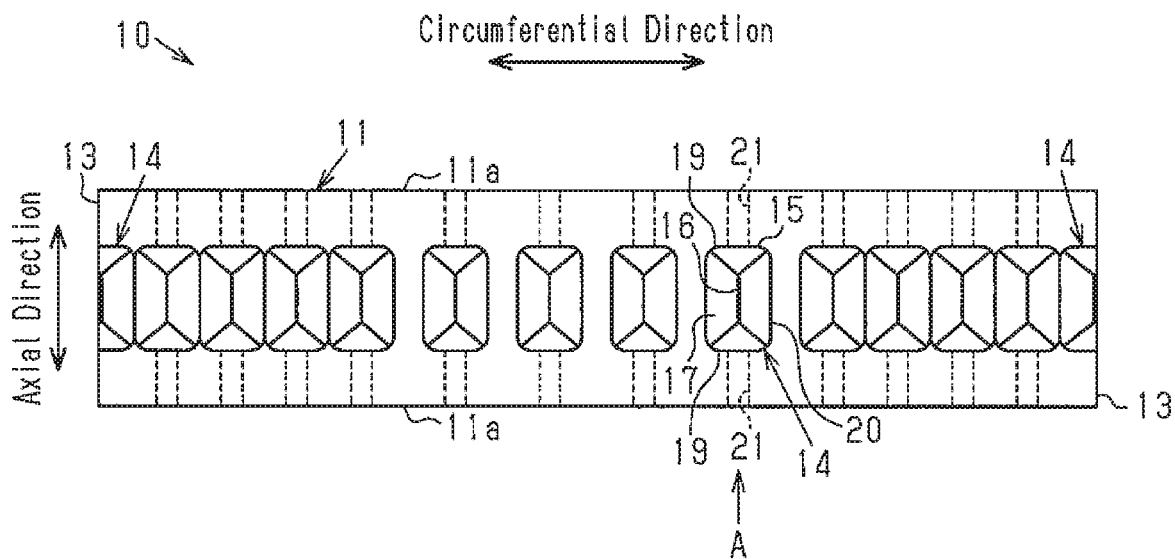
FIG. 8A is a front view showing a developed state of a tolerance ring according to a second embodiment.

As shown in FIG. 8A, the main body 11 has grooves (recesses) 21 on the inner circumferential surface in the radial direction. The grooves 21 extend straight respectively from the ends 11a on the opposite sides of the main body 11 and communicate with the inside of the protuberance 14, that is, the depression S. In the present embodiment, among the protuberances 14, the ones provided with the grooves 21 will be referred to as specific protuberances. The grooves 21 are connected to the depression S at the short-side ends 19, which are on the opposite sides in the axial direction of the main body 11.

Figure 8B:
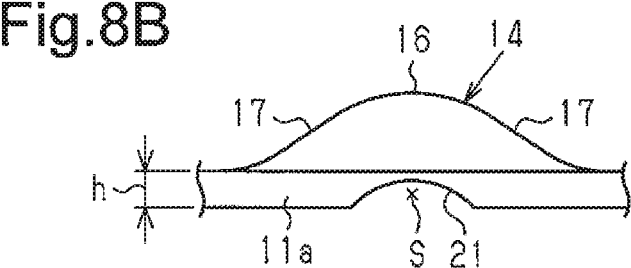
FIG. 8B is a diagram of the tolerance ring of FIG. 8A as viewed in the direction of arrow A.

As shown in FIG. 8B, the groove 21 has a depth that is less than the thickness h of the main body 11. Thus, on the outer circumferential surface, the main body 11 has no sections that protrude outward in the radial direction of the main body 11 at positions corresponding to the grooves 21.

The operation of the tolerance ring 10 of the present embodiment will now be described.

When the tolerance ring 10 constitutes part of a torque limiter, wear debris D is generated by repeated slip rotations of the tolerance ring 10. In the process of lubricant flowing into or out of the specific protuberances through the grooves 21, the wear debris D is discharged from the inside of the specific protuberances, for example, to the outside of the specific protuberances.

As the lubricant flowing into the specific protuberances is discharged in this manner, the wear debris D, which is generated by repeated slip rotations of the tolerance ring 10, is discharged from the inside of the specific protuberances. Thus, the wear debris D does not easily accumulate in the specific protuberances.

As described above, the present embodiment achieves the advantages equivalent to the advantages (1) and (2) of the first embodiment.

Third Embodiment

A tolerance ring according to a third embodiment will now be described. The same reference numerals are given to those components that are the same as the corresponding components of the already described embodiments, and redundant explanations are omitted.

Figure 9A:
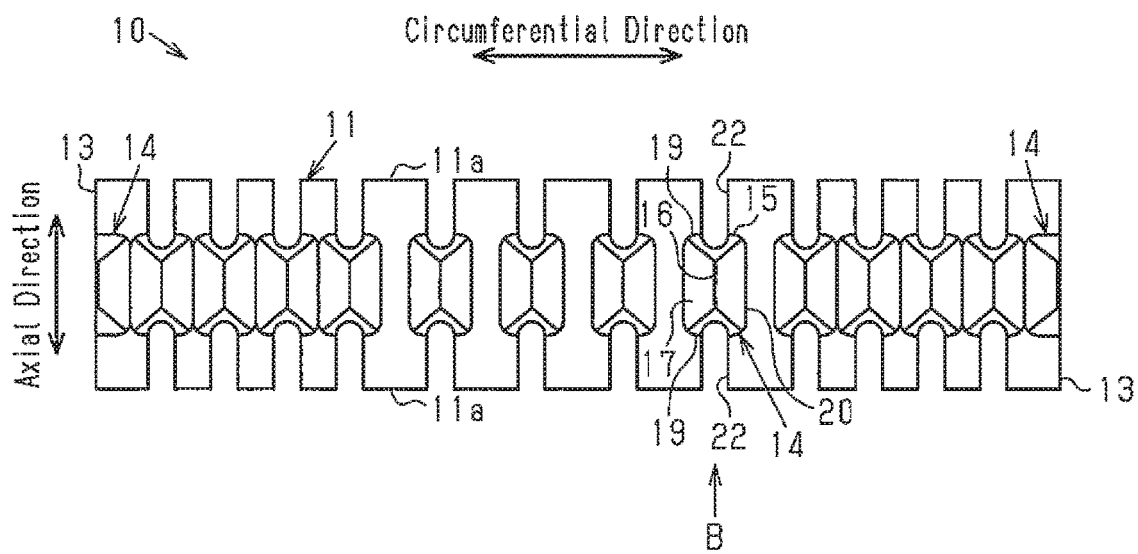
FIG. 9A is a front view showing a developed state of a tolerance ring according to a third embodiment.
Figure 9B:
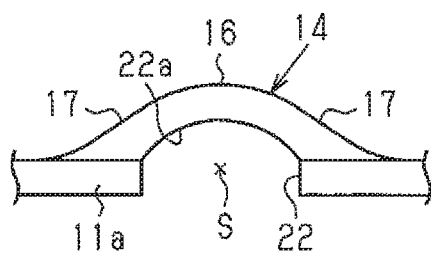
FIG. 9B is a diagram of the tolerance ring of FIG. 9A as viewed in the direction of arrow B.

As shown in FIGS. 9A and 9B, the main body 11 has slit-shaped notches 22. The notches 22 extend straight respectively from the ends 11a on the opposite sides of the main body 11. The notches 22 reach the inside of the protuberances 14, that is, the depression S. In the present embodiment, among the protuberances 14, the ones provided with the notches 22 will be referred to as specific protuberances. The notches 22 are connected to the depression S at the short-side ends 19, which are on the opposite sides in the axial direction of the main body 11. Each notch 22 has a communication port 22a, which communicates with the inside of the specific protuberance, and the communication port 22a reaches a position midway on the slope of the rising portion 17 in the main body 11.

The operation of the tolerance ring 10 of the present embodiment will now be described.

When the tolerance ring 10 constitutes part of a torque limiter, wear debris D is generated by repeated slip rotations of the tolerance ring 10. In the process of lubricant flowing into or out of the specific protuberances through the notches 22 (the communication ports 22a), the wear debris D is discharged from the inside of the specific protuberances, for example, to the outside of the specific protuberances.

As the lubricant flowing into the specific protuberances is discharged in this manner, the wear debris D, which is generated by repeated slip rotations of the tolerance ring 10, is discharged from the inside of the specific protuberances. Thus, the wear debris D does not easily accumulate in the specific protuberances.

As described above, the present embodiment achieves the advantages equivalent to the advantages (1) and (2) of the first embodiment.

Each of the above illustrated embodiments may be modified as follows.

In the case where slip rotation of the tolerance ring 10 occurs between the sleeve 40 and the tolerance ring 10, a manganese phosphate coating FL may be provided at least on the outer circumferential surface of the main body 11. In contrast, in the case where slip rotation of the tolerance ring 10 occurs between the shaft 30 and the tolerance ring 10, a manganese phosphate coating FL may be provided at least on the inner circumferential surface of the main body 11.

In each of the above-described embodiments, the end-gap protuberances may be provided with extensions (recesses), grooves, or notches connected to the inside of the end-gap protuberances as with the specific protuberance.

In each of the above-described embodiments, the extensions 18 (the recesses 18a), the grooves 21, and the notches 22 provided for the specific protuberances are provided on both sides in the axial direction of the specific protuberances. However, the extensions 18 (the recesses 18a), the grooves 21, and the notches 22 may be omitted from one of the sides in the axial direction of the specific protuberances. Also, the specific protuberances may include protuberances from which the extension 18 (the recess 18a), the groove 21, or the notch 22 on one side is omitted and protuberances without such omission.

In each of the above-described embodiment, the protuberances 14 excluding the end-gap protuberances may include ones with the extensions 18, (the recesses 18a), the grooves 21, or the notches 22 and ones without these.

In each of the above-described embodiments, although the main body 11 has a single row of the protuberances 14, which are arranged along the circumference of the main body 11, the main body 11 may have two or three rows of the protuberances 14. This configuration may be applied to each of the modifications.

Figure 10:
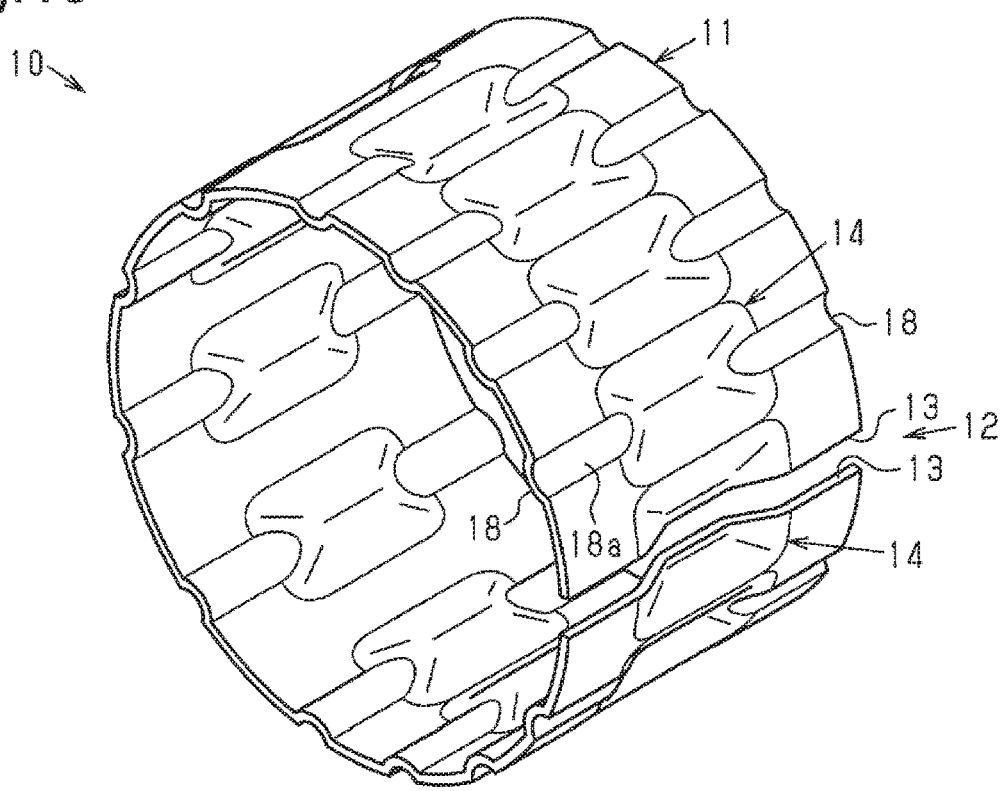
FIG. 10 is a perspective view illustrating a tolerance ring of a modification.
Figure 11:
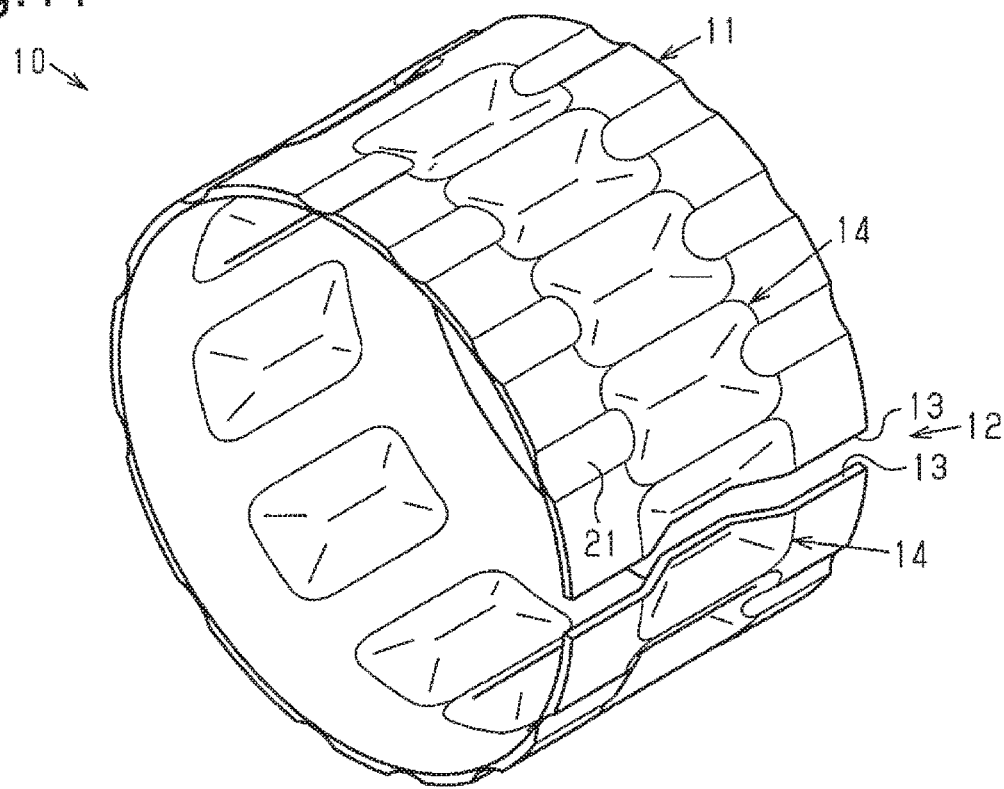
FIG. 11 is a perspective view illustrating a tolerance ring of a modification.
Figure 12:
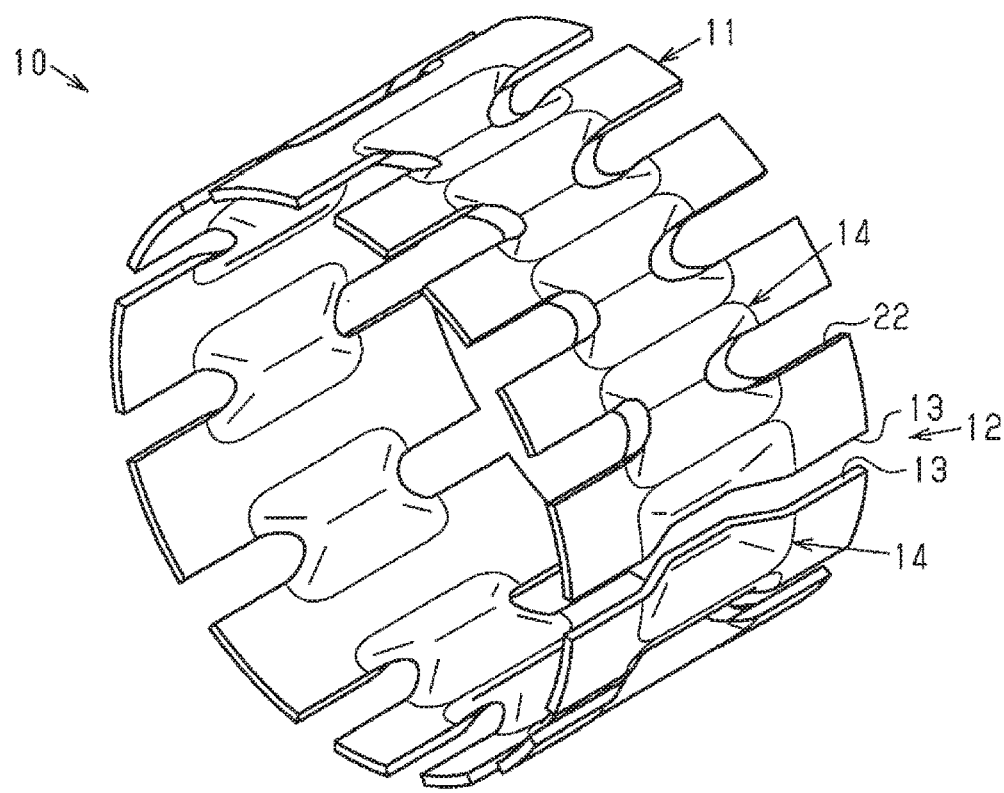
FIG. 12 is a perspective view illustrating a tolerance ring of a modification.

In each of the above-described embodiments and modifications, the protuberances 14 may protrude radially inward from the outer circumferential surface of the main body 11 as shown in FIGS. 10 to 12. In this case, when the tolerance ring 10 is fitted in an elastically deformed state between the outer circumferential surface of the shaft 30 and the inner circumferential surface of the sleeve 40, into which the shaft 30 is inserted, the ridge portions 16 of the protuberances 14 contact the outer circumferential surface of the shaft 30, unlike the above-described embodiments, in which the ridge portions 16 contact the inner circumferential surface of the sleeve 40. The inside of each specific protuberance (the depression S) is located between the tolerance ring 10 and the inner circumferential surface of the sleeve 40. If repeated slip rotations of the tolerance ring 10 occur between the tolerance ring 10 and the sleeve 40, wear debris D tends to accumulate between the tolerance ring 10 and the inner circumferential surface of the sleeve 40, especially inside the specific protuberances (the depressions S). However, in the process of the lubricant Lb flowing into or out of the specific protuberances through the extensions 18 (the recesses 18a), the grooves 21, or the notches 22, the wear debris D is discharged from the inside of the specific protuberances, for example, to the outside of the specific protuberances. In this manner, even if the protuberances 14 protrude radially inward in the main body 11, the same action and advantages as those of the above-described embodiment and modifications will be achieved.

Figure 13:
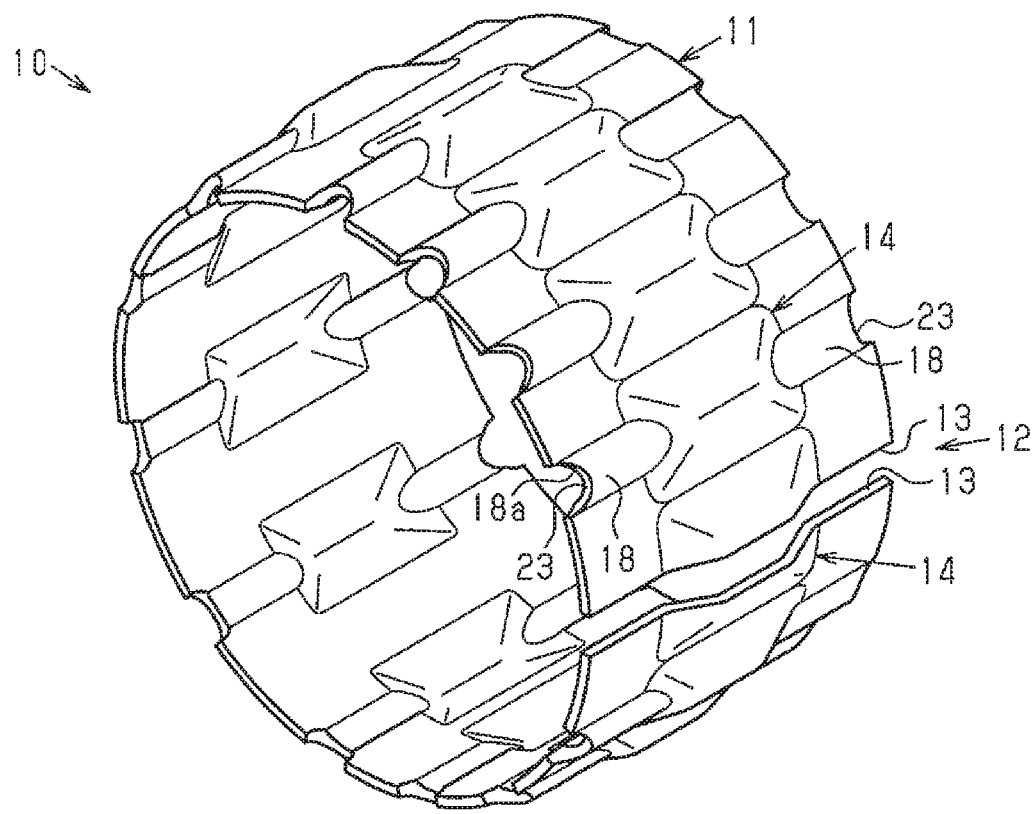
FIG. 13 is a perspective view illustrating a tolerance ring of a modification.

In the first embodiment, each extension 18 may be provided with a cutout port 23 at either end in the axial direction as shown in FIG. 13. As a result, even when a peripheral member (not shown) is located in the vicinity of the end 11a of the main body 11 of the tolerance ring 10, the lubricant can flow into or out of the specific protuberance through the cutout port 23.

Figure 14:
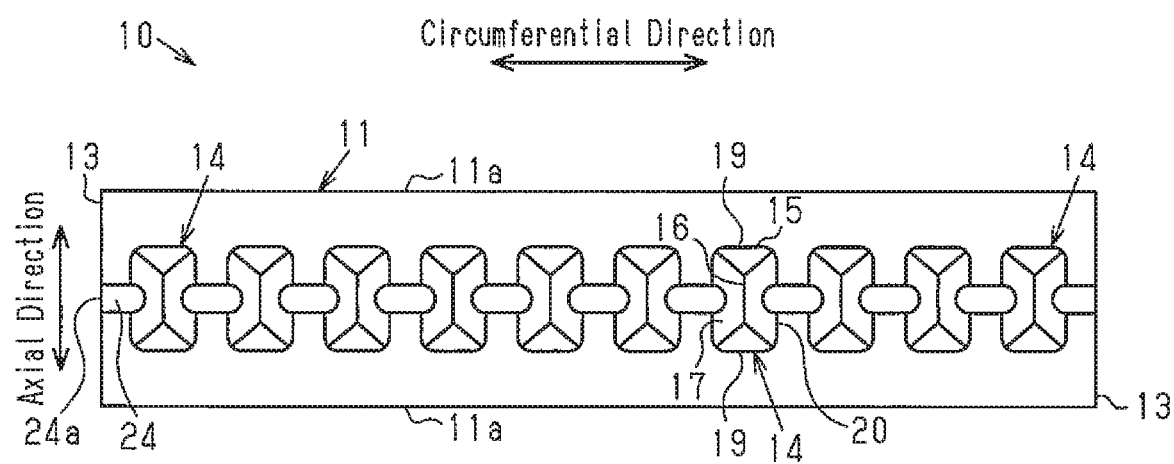
FIG. 14 is a front view showing a developed state of a tolerance ring of a modification.

As shown in FIG. 14, the main body 11 may have extensions 24 that extend in the circumferential direction. The extensions 24 extend straight to the ends 13 in the circumferential direction of the main body 11. In FIG. 14, the end-gap protuberances are provided apart from the end gap 12 and the extensions 24 extend from the end-gap protuberances to the ends 13 of the circumferential direction of the main body 11. In FIG. 14, to better illustrate the features of the configuration of this modification, the protuberances 14 appear to be arranged at predetermined intervals (equally spaced in FIG. 14) in the circumferential direction. Each extension 24 may have a recess 24a on the inner side in the radial direction, that is, on the inner circumferential surface of the main body 11. Regardless of the thickness of the main body 11, the recesses 24a may have a depth equal to the thickness or may have a depth greater or less than the thickness. Each recess 24a extends straight from the end 13 in the circumferential direction of the main body 11 and communicates with the inside of the end-gap protuberance, that is, the depression S. For the protuberances 14 that are not adjacent to the ends 13 of the main body 11, that is, for the protuberances 14 except for the end-gap protuberances, an extension 24 (a recess 24a) may be provided between each pair of the protuberances 14 that are adjacent to each other in the circumferential direction. Each extension 24 (the recess 24a) connects the insides of the protuberances 14 adjacent to each other in the circumferential direction. As a result, the inside of each protuberance 14 communicates with the ends 13 in the circumferential direction of the main body 11. Also, the extensions 24 (the recesses 24a) in FIG. 14, which extend in the circumferential direction of the main body 11, may be used together with the extensions 18 (the recesses 18a) in FIG. 1, which extend in the axial direction of the main body 11. Also, like the extensions 24 (the recesses 24a) in FIG. 14, the main body 11 of the second embodiment may have grooves extending in the circumferential direction of the main body 11 in place of or in addition to the grooves 21 extending in the axial direction of the main body 11. Likewise, the main body 11 of the third embodiment may have notches extending from the ends 13 of the end gap 12 in the circumferential direction of the main body 11 in place of or in addition to the notches 22, which extend in the axial direction of the main body 11. The configuration of extensions, grooves, or notches that extend in the circumferential direction of the main body 11 may be applied to the modifications of FIGS. 10 to 12, which the protuberances 14 protrude radially inward of the main body 11.

Figure 15:
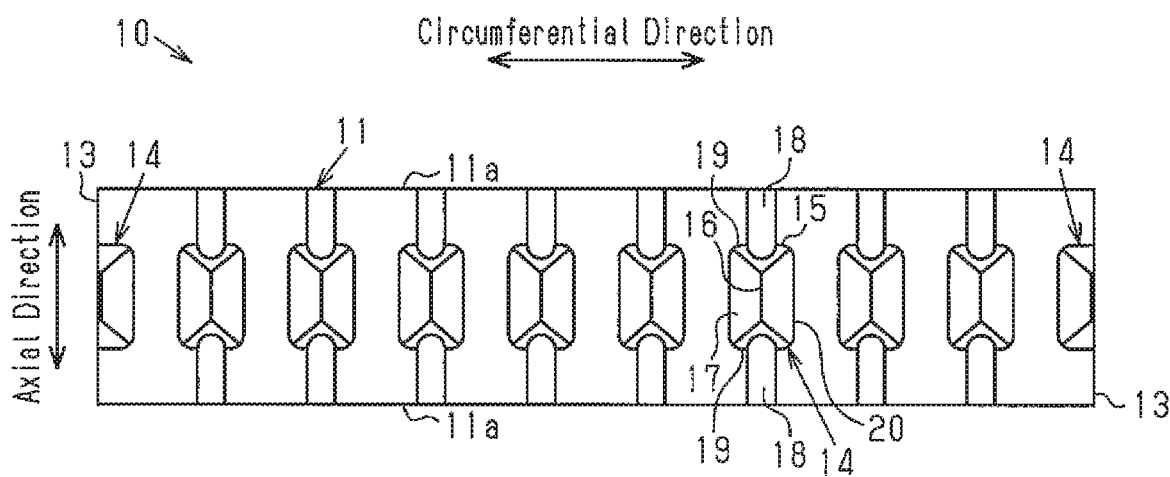
FIG. 15 is a front view showing a developed state of a tolerance ring of a modification.

The arrangement of the modification (FIG. 14), in which the protuberances 14 are arranged at predetermined intervals in the circumferential direction, may be applied to the first embodiment as shown in FIG. 15. Also, this arrangement can be similarly applied to the second embodiment, the third embodiment, and each of the modifications.

Figure 16:
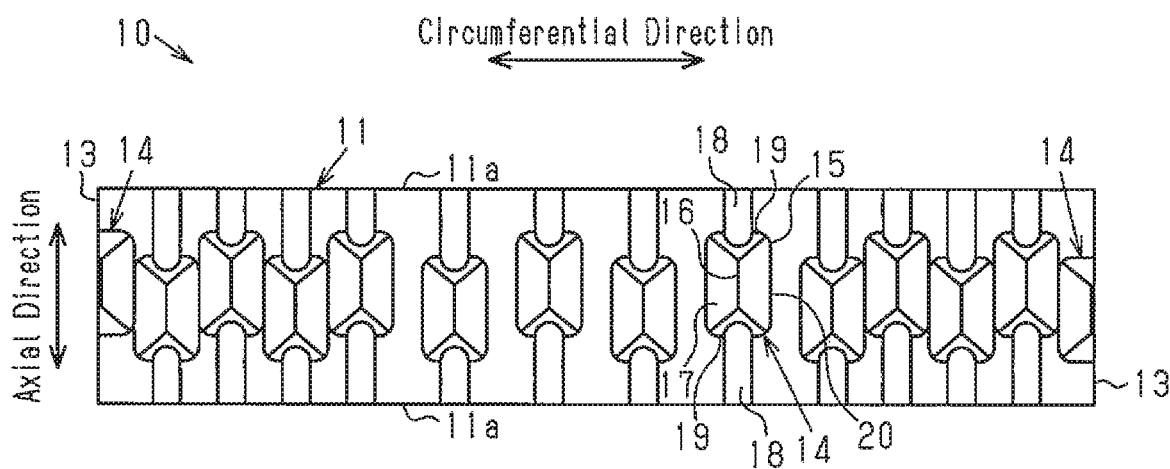
FIG. 16 is a front view showing a developed state of a tolerance ring of a modification.

In the first embodiment, the protuberances 14 that are adjacent to each other in the circumferential direction of the main body 11 may be arranged in a staggered manner in the axial direction as shown in FIG. 16. That is, each adjacent pair of the protuberances 14 are arranged offset from each other in the axial direction. This structure disperses, in the axial direction, sections where the surface pressure is likely to act between the tolerance ring 10 and the shaft 30 or the sleeve 40, thereby reducing wear of the tolerance ring 10. Also, this arrangement can be similarly applied to the second embodiment, the third embodiment, and each of the modifications.

In the above-described embodiments, the present invention is applied to torque limiters in which the tolerance ring 10 slips on and rotates relative to the shaft 30 or the sleeve 40 when the allowable value is exceeded. However, the present invention may be applied to a limiter in which the tolerance ring 10 slips in the axial direction on the shaft 30 or the sleeve 40 when the holding force in the axial direction between the shaft 30 and the sleeve 40 exceeds the allowable value.

The invention claimed is:

1. A tolerance ring comprising:
    a main body, which has an inner circumferential surface and an outer circumferential surface; and
    a plurality of protuberances, which protrudes outward in a radial direction from the inner circumferential surface of the main body,
    wherein the tolerance ring is fitted between an outer circumferential surface of a shaft and an inner circumferential surface of a sleeve, into which the shaft is inserted,
    wherein the main body includes a recess that extends from an end of the main body to at least one of the protuberances and communicates with an inside of the at least one of the protuberances,
    wherein at least one of the protuberances includes an extension that constitutes part of the at least one of the protuberances and extends to the end of the main body, and the recess is defined by an inner wall of the extension,
    wherein the at least one of the protuberances is configured to contact the inner circumferential surface of the sleeve and the extension is configured not to be in contact with the inner circumferential surface of the sleeve, and
    wherein a lubricant, which is stored between the outer circumferential surface of the shaft and the inner circumferential surface of the sleeve, is configured to flow into and out of the at least one of the protuberances through the recess.

2. The tolerance ring according to claim 1, wherein a manganese phosphate coating is provided on at least one of the inner circumferential surface and the outer circumferential surface of the main body.

3. The tolerance ring according to claim 1, wherein the recess extends from an end in an axial direction of the main body to the at least one of the protuberances.

4. The tolerance ring according to claim 1, wherein
    the recess is one of a plurality of recesses, and
    the at least one of the protuberances is provided with two of the recesses each at either end in an axial direction of the main body.

5. A tolerance ring comprising:
    a main body, which has an inner circumferential surface and an outer circumferential surface; and
    a plurality of protuberances, which protrudes inward in a radial direction from the outer circumferential surface of the main body,
    wherein the tolerance ring is fitted between an outer circumferential surface of a shaft and an inner circumferential surface of a sleeve, into which the shaft is inserted,
    wherein the main body includes a recess that extends from an end of the main body to at least one of the protuberances and communicates with an inside of the at least one of the protuberances,
    wherein at least one of the protuberances includes an extension that constitutes part of the at least one of the protuberances and extends to the end of the main body, and the recess is defined by a wall of the extension on the outer circumferential surface of the main body, wherein the at least one of the protuberances is configured to contact the outer circumferential surface of the shaft and the extension is configured not to be in contact with the outer circumferential surface of the shaft, and
    wherein a lubricant, which is stored between the outer circumferential surface of the shaft and the inner circumferential surface of the sleeve, is configured to flow into and out of the at least one of the protuberances through the recess.

* * * * *